Figure 1:
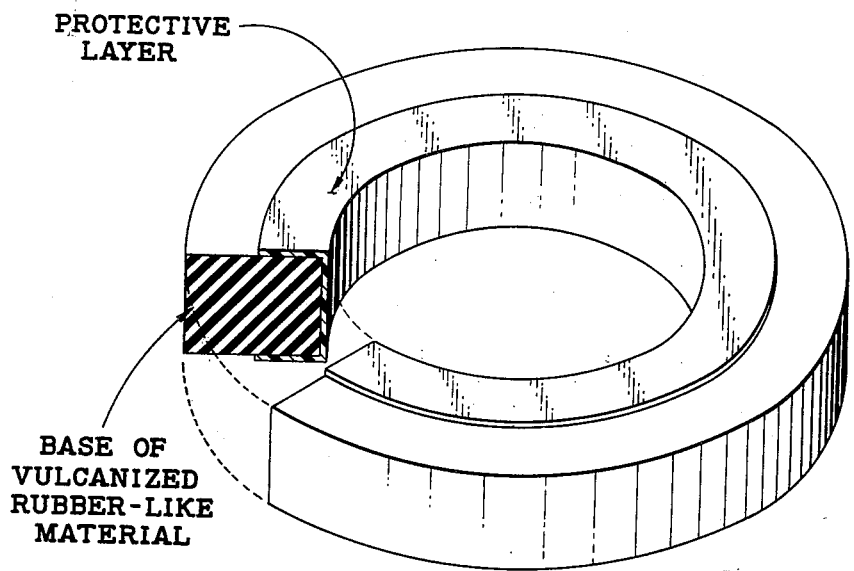

May 27, 1952   E. COUSINS   2,597,976
GASKET
Filed Oct. 11, 1949

INVENTOR.
EDWARD COUSINS
BY
R. L. Miller
ATTORNEY

Patented May 27, 1952

2,597,976

UNITED STATES PATENT OFFICE 2,597,976

GASKET

Edward Cousins, Akron, Ohio, assignor to Wingfoot Corporation, Akron, Ohio, a corporation of Delaware Application October 11, 1949, Serial No. 120,810

7 Claims. (Cl. 154—43)

This invention relates to a coated or laminated rubber-like product. The invention is particularly useful in the manufacture of gaskets or packing material.

Numerous synthetic rubber-like materials are known which are resistant to the action of liquid hydrocarbon fuels. However, these same materials when exposed to low temperatures tend to become stiff, losing their flexible, resilient, rubber-like qualities. Other materials known to possess flexibility over wide temperature ranges are not resistant to the solvent and swelling action of liquid hydrocarbon fuels.

It is therefore an object of this invention to produce a composite rubber-like product which will possess substantial resistance to the solvent and swelling action of liquid hydrocarbons, both aliphatic and aromatic, particularly those mixtures used as fuels, including aromatic blend gasolines, which product will retain its resilient, flexible, rubber-like characteristics over a wide temperature range, for example from about 200° F. to —70° F. It is a particular object of this invention to obtain a product which will, at temperatures for example from 200° F. to —70° F., possess all of the following characteristics:

1. Resistance to the swelling and solvent action of aromatic blend gasolines.
2. Resistance to plastic flow under pressure.
3. Ability to exert pressure continuously while being compressed.
4. Ability to seal rough bearing surfaces against leakage of liquids under pressure along such surfaces.
5. Retention of flexibility.

Until the present invention was made, no known material or combination of materials possessed all of the above characteristics. It has now been discovered that certain combinations of materials assembled properly do possess the required properties.

According to the present invention, the base of the combination is formed from a cured rubber-like material of which natural rubber is a preferred example. Also useful are mixtures of natural rubber with up to an equal amount (by weight) of the polymer resulting from the polymerization of butadiene. A polymer resulting from the polymerization of from 100% to 75% by weight of butadiene and from 0% to 25% by weight of styrene may also be used. While the use of polybutadiene by itself is satisfactory, it has been found desirable to mix natural rubber with the polybutadiene to improve the physical properties of the pure polybutadiene stock. The compounding and curing of these rubber-like materials are in accordance with the usual procedures familiar to those skilled in the art.

It should be noted that certain of these rubber-like materials, for example natural rubber, polybutadiene which has been polymerized at a low temperature (e. g. 41° F. or below), and the copolymer of butadiene with up to 20% of styrene which polymer has been polymerized at a low temperature (e. g. 41° F. or below) will, when exposed for relatively long periods of time (e. g. one week or more) at a temperature range between about 0° F. and —40° F. become stiff due to crystallization. This crystallization will not occur when the materials are exposed to temperatures above about 0° F. or below about —40° F. nor when the materials are exposed to temperatures between this approximate range for relatively short periods of time, for example less than one week. It should therefore be observed that when the product is to be exposed to the crystallization temperatures between about 0° F. and —40° F. continuously for extended periods of time, a material which is not subject to crystallization should be employed, such as for example polybutadiene which has been polymerized at relatively high temperatures (e. g. about 120° F.), mixtures of such polybutadiene with natural rubber, or a polymer resulting from the polymerization at relatively high temperatures (approximately 120° F.) of from 100% to 75% by weight of butadiene and from 0% to 25% by weight of styrene.

The base of the combination formed from the rubber-like material is then covered, either partially or entirely, by a protective layer which may or may not be permanently attached to the rubber-like body. Although a number of materials are satisfactory for use as the protective layer, the preferred material is nylon. By the generic term "nylon" is meant any long chain synthetic polymeric amide which has recurring amide groups as an integral part of the main polymer chain. The term refers to an entire family of polyamide resins which are generally products of the reaction of polycarboxylic acids and polyfunctional amines, or equivalent systems, which reaction is carried out in such a way that predominately linear polymers are formed. Representative examples of materials which come under and are included in the generic term "nylon," as it is understood in the art, are:

1. Simple polyamides from diamines and dicarboxylic acids, such as polyhexamethylene adipamide, or polydecamethylene sebacamide.

2. Simple polyamides from amino carboxylic acids, or their equivalents such as polymerized epsilon caprolactam.

3. Interpolyamides from two or more salts of diamines and dicarboxylic acids, such as the co-condensation product of hexamethylene diamine, adipic acid, decamethylene diamine, and sebacic acid.

4. Interpolyamides from one or more diamine-dicarboxylic acid salts and amino carboxylic acids, or equivalents thereof, such as the co-condensation product of hexamethylene diamine, adipic acid, and epsilon caprolactam.

5. Simple polyesteramides from diamines, dicarboxylic acids and glycols, such as the condensation product of hexamethylene diamine and adipic acid with ethylene glycol.

6. Derivatives or reaction products from the polymers in the above examples. For example, any of the polymers which have been shown in the above examples when treated with formaldehyde, phenol-formaldehyde or urea-formaldehyde. Modified polymers of this class may be termed "N-alkoxylated polyamides."

7. N-alkylated polyamides. For example, the condensation product of N-N'-diisobutyl hexamethylene diamine and adipic acid.

Any of the above-described materials and other nylons known in the art may be used as the protective covering. However, it may be found necessary in using certain less flexible nylons to plasticize them by the addition of suitable plasticizers. The form of nylon which has been found to be particularly useful in the operation of this invention is that which is referred to above as "N-alkoxylated polyamides" and derivatives thereof, as described for example in U. S. Patent 2,430,860 to T. L. Cairns.

Other materials which may be used as the protective covering are polytetrafluoreothylene, polymonochlotrifluoroethylene, polyvinyl alcohol, methyl cellulose, and a mixture of nylon with up to an equal amount by weight of the polymer resulting from the polymerization of from 100% to 55% by weight of butadiene and 0% to 45% by weight of acrylonitrile. Another material which has been found useful as a protective covering is the olefin polysulfide type of synthetic rubber sold under the trade name "Thiokol," by the Thiokol Corporation. There are a number of recognized variations in the manufacture of this type of synthetic, but the fundamental type reaction may be illustrated by the interaction of ethylene dichloride and sodium polysulfide to to form what is regarded as a high molecular weight straight chain polymer. However, the reaction is not limited to these specific materials and the olefin polysulfide rubbers are sometimes more generally referred to as the reaction products of alkylene dihalides and alkali metal polysulfides. Also, as a particular variant, the alkylene chain may be interrupted, for example, by oxygen or sulfur. Thus, dichlor diethyl ether may be used instead of ethylene dichloride. Other modifications are also possible. This chain type of polymer, which will be referred to hereinafter as a polyalkylene polysulfide, is well recognized in the art.

Figure 2:
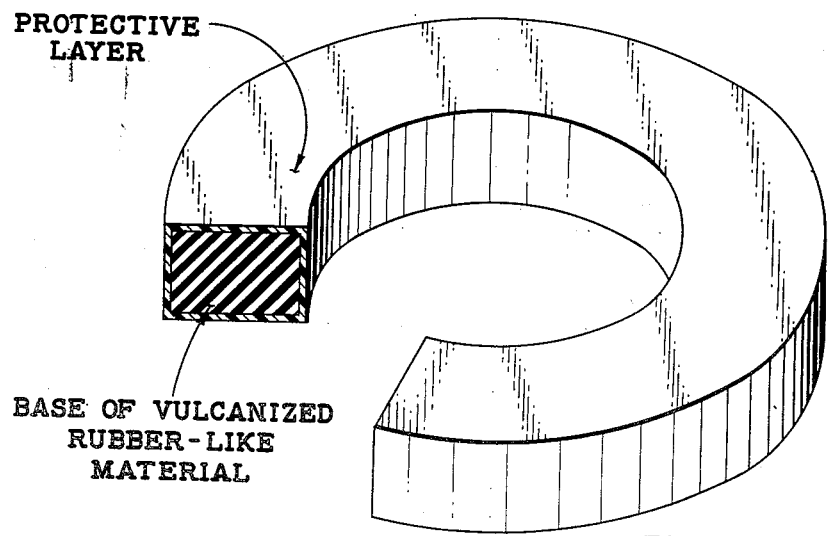

The invention is illustrated by the accompanying drawing in which:

Fig. 1 is an isometric view with parts broken away and in section of a simple gasket or washer having a base of vulcanized rubber-like material and a protective layer partially covering the surface of the base material; and Fig. 2 is an isometric view with parts broken away and in section of a simple gasket or washer having a base of vulcanized rubber-like material and a protective layer completely covering the exposed surfaces of the base material.

The method of applying the protective layer will, of course, depend upon the particular materials being used. Those materials which are soluble in commercial solvents may be applied to the surface to be protected by painting, spraying or dipping. It has been found desirable in those instances where a tight bond between the body to be protected and the protective layer is required, to prepare the surface to be covered by treating with a bonding agent, such as methylene diphenyl diisocyanate. The protective material may also be applied in the form of a pre-formed film. Such films are produced through the usual methods, for example by casting, extruding, forming, cutting, dipping and the like. Since only those surfaces to be exposed to the action of the fuel need be protected, it is obvious that in some cases the protective layer need cover only part of the surface of the finished product.

The thickness of the protective layer will, of course, vary, depending upon the material used and the product to be covered. In general, the thickness of the protective layer will be determined by the necessity of providing a continuous film over the surface of the rubber-like base to be protected. Depending upon the type of material used, it has been found that a thickness range from 0.001 inch to 0.006 inch is satisfactory.

The practice of the invention is illustrated by the following representative examples:

*Example 1*

Cured natural rubber discs approximately 0.080 inch thick and 1.5 inches in diameter were completely covered with a nylon film 0.002 inch thick. The film was then heat-sealed around the rubber discs by the application of heat and pressure to the surfaces to be sealed.

*Example 2*

Molded natural rubber gaskets were covered by a film of the following composition:

| | Parts |
|---|---|
| N-alkoxylated polyamide | 100 |
| Diacetin | 30 |
| Zinc stearate | 1 |

*Example 3*

Molded natural rubber gaskets were dipped in a solution of the following composition:

| | Parts |
|---|---|
| N-alkoxylated polyamide | 100 |
| Diacetin | 50 |
| Denatured alcohol | 280 |
| Distilled water | 120 |

The covered rubber discs prepared according to Example 1 along with other rubber discs which were not protected by the nylon film were immersed for 36 hours at 77° F. in SR-6 fuel which has the following composition by weight:

60% diisobutylene
20% toluene
15% xylene
5% benzene

The unprotected rubber showed an average increase in weight of 159.5%, while the discs protected by the nylon film showed an average increase in weight of only 2%. The results of these tests indicated not only the resistance of the nylon to the solvent action of the SR-6 fuel but also its resistance to the diffusion of the fuel through the protective film.

The molded gaskets prepared according to Examples 2 and 3, along with other molded gaskets made from a copolymer of 80% butadiene and 20% acrylonitrile commonly known as a low temperature flexible type copolymer, were tested in a pipe line containing SR-6 fuel at room temperature under approximately 100 pounds pressure. None of the gaskets so tested at room temperature showed leakage. The same gaskets were then tested at −70° F. in a pipe line containing SR-6 fuel under approximately 100 pounds pressure. The unprotected butadiene-acrylonitrile gaskets showed such excessive leakage that the fuel escaped in a strong steady stream, while the crude rubber gaskets protected by the nylon covering showed no leakage.

While certain representative embodiments and details have been shown for the purpose of illustrating the invention, it will be apparent to those skilled in this art that various changes and modifications may be made therein without departing from the spirit or scope of the invention.

I claim:

1. A gasket element resistant to the swelling and solvent action of liquid hydrocarbon fuel and which retains its flexibility and sealing properties over a temperature of from 200° F. to −70° F., said gasket element comprising an endless body of a vulcanized rubber selected from the group consisting of natural rubber, a mixture of natural rubber with up to an equal amount of polybutadiene, and a polymer resulting from the polymerization of from 100% to 75% by weight of butadiene and from 0% to 25% by weight of styrene, said endless body being covered at least on its entire inner periphery by a continuous layer of a film-forming material which is resistant to the solvent and swelling action of liquid hydrocarbon fuels and selected from the group consisting of nylon, polyalkylene polysulfides, polytetrafluoroethylene, polymonochlortrifluoro ethylene, polyvinyl alcohol, methyl cellulose, and a mixture of nylon with up to an equal amount by weight of a polymer resulting from the polymerization of from 100% to 55% by weight of butadiene and from 0% to 45% by weight of acrylonitrile.

2. A gasket element defined by claim 1 in which the endless body is covered on its entire inner periphery and on at least a portion of its outer periphery by a continuous layer of the film-forming material.

3. A gasket element defined by claim 1 in which the endless body is covered by a continuous layer of film-forming material.

4. A gasket element resistant to the swelling and solvent action of liquid hydrocarbon fuel and which retains its flexibility and sealing properties over a temperature of from 200° F. to −70° F., said gasket element comprising an endless body of a vulcanized rubber selected from the group consisting of natural rubber, a mixture of natural rubber with up to an equal amount of polybutadiene, and a polymer resulting from the polymerization of from 100% to 75% by weight of butadiene and from 0% to 25% by weight of styrene, and a coating of a continuous layer of a film-forming material which is resistant to the solvent and swelling action of liquid hydrocarbon fuels and selected from the group consisting of nylon, polyalkylene polysulfides, polytetrafluoroethylene, polymonochlortrifluoro ethylene, polyvinyl alcohol, methyl cellulose, and a mixture of nylon with up to an equal amount by weight of a polymer resulting from the polymerization of from 100% to 55% by weight of butadiene and from 0% to 45% by weight of acrylonitrile, said coating covering at least the entire inner periphery of said endless body.

5. A gasket element defined by claim 1 in which the vulcanized rubber is a blend of natural rubber with up to an equal amount by weight of polybutadiene and the film-forming material is nylon.

6. A gasket element defined by claim 1 in which the vulcanized rubber is natural rubber and the film-forming material is nylon.

7. A gasket element defined by claim 1 in which the vulcanized rubber is a blend of 60 parts by weight of natural rubber and 40 parts by weight of polybutadiene and the film-forming material is nylon.

EDWARD COUSINS.

REFERENCES CITED

The following references are of record in the file of this patent:

UNITED STATES PATENTS

| Number | Name | Date |
|---|---|---|
| 2,425,348 | Schroeder | Aug. 12, 1947 |
| 2,443,486 | Watkins | June 15, 1948 |
| 2,449,180 | Schroeder | Sept. 14, 1948 |
| 2,484,810 | Bacon et al. | Oct. 18, 1949 |